United States Patent
Lie (10) Patent No.: US 6,735,878 B2
(45) Date of Patent: May 18, 2004

(54) METHOD AND DEVICE FOR CENTERING A WHEEL

(76) Inventor: Peter Lie, Selliusstrasse 9, 20255 Hamburg (DE)

( * ) Notice: Subject to any disclaimer, the term of this patent is extended or adjusted under 35 U.S.C. 154(b) by 0 days.

(21) Appl. No.: 10/344,019

(22) PCT Filed: Aug. 6, 2001

(86) PCT No.: PCT/EP01/09067

§ 371 (c)(1),
(2), (4) Date: Feb. 5, 2003

(87) PCT Pub. No.: WO02/12829

PCT Pub. Date: Feb. 14, 2002

(65) Prior Publication Data

US 2003/0136015 A1 Jul. 24, 2003

(30) Foreign Application Priority Data

Aug. 7, 2000 (DE) .......................... 100 39 553
Apr. 5, 2001 (DE) .......................... 101 18 802

(51) Int. Cl.⁷ ............................................. G01B 5/24
(52) U.S. Cl. ................... 33/203; 33/203.12; 29/407.09; 29/464
(58) Field of Search ............................. 33/203, 203.12, 33/203.15, 549, 550, 551, 555; 29/407.05, 407.09, 464, 271

(56) References Cited

U.S. PATENT DOCUMENTS

| | | | | |
|---|---|---|---|---|
| 4,126,942 A | * | 11/1978 | Damman | ................. 33/203.12 |
| 4,417,237 A | | 11/1983 | Korth | |
| 4,910,986 A | * | 3/1990 | Funkhouser | ................ 72/31.02 |
| 5,103,414 A | | 4/1992 | Papadopoulos | |
| 5,459,930 A | * | 10/1995 | Crisick | ......................... 33/201 |

FOREIGN PATENT DOCUMENTS

| | | |
|---|---|---|
| DE | 43 20 585 A1 | 6/1993 |
| DE | 197 45 179 | 4/1999 |
| FR | 2 355 675 | 1/1978 |

* cited by examiner

Primary Examiner—Christopher W. Fulton
Assistant Examiner—Tania C. Courson
(74) Attorney, Agent, or Firm—Norris McLaughlin & Marcus (57) ABSTRACT

The invention relates to a method and a device for centring a wheel, especially a cycle wheel. The values of the lateral run-out and/or the radial run-out of the wheel rim are measured. The lateral run-out and/or the radial run-out of the wheel rim are then eliminated by rotating the spoke nipple. The lateral run-out and/or the radial run-out are determined by means of measuring devices which can be fixed to a centring stand and which comprise pointer mechanisms (18 and/or 20).

15 Claims, 8 Drawing Sheets

METHOD AND DEVICE FOR CENTERING A WHEEL

The invention relates to a method and device for centering a wheel with the features recited in the preamble of claims 1 and 3.

It is known to compensate the lateral runout and radial runout of a wheel with a device operating as a centering aid. The wheel to be tested it is hereby clamped in a mount of the centering aid and rotated. The values of the axial and radial runout of the wheel rim are measured by suitable measuring devices. The lateral runout and the radial runout are then compensated by rotating the spoke nipples of the wheel. Dial gauges are customarily used as measuring devices. Dial gauges disadvantageously only indicate the instantaneous value of the lateral and radial runout, so that several revolutions of the wheel are required if the lateral and radial runout is to be accurately corrected from a determination of the maximum deviations. On the other hand, the pointers of the dial gauges which typically have displays accurate to about 0.01 mm may require several revolutions when measuring the axial and radial deviations of the wheel rim. As a result, the number of revolutions of pointer of the dial gauge typically have to be counted for determining the measurement values. The entire process for determining the measurement values is therefore time-consuming, and the person performing the test has to be attentive and concentrate, since he/she has to always remember the number of revolutions. Finally, this process can easily lead to errors in the determination of the measurement values, which makes it more difficult and more time-consuming to correct the deviations in the axial and radial direction.

It is therefore an object of the invention to provide a method and device of the aforedescribed type which enables centering of a wheel in a simple, quick and accurate matter.

The object is solved by a method and a device with the characterizing features recited in the independent claims 1 and 3. According to the method, the wheel hub is clamped in a wheel mount of a centering stand, the wheel is rotated, whereby each of the maximum left and right lateral runout of the wheel rim is determined as a measurement value from a complete revolution of the wheel, the measurement value of the left (respectively right) maximum lateral runout of the wheel rim is recorded, including its mathematical sign, a negative sign is associated with the measurement value left of the zero position and a positive sign is associated with the measurement value right of the zero position, the wheel is clamped after being rotated by 180°, each of the maximum left and right lateral runout of the wheel rim is determined as a measurement value from a complete rotation of the wheel, the first left (respectively the first right) maximum lateral runout and the second right (respectively the second left) maximum lateral runout of the wheel rim are subtracted from each other, the value determined in the previous step is divided by 2, with a positive sign associated with the so obtained value, the value determined in the previous step is subtracted from the right (respectively left) maximum lateral runout of the wheel rim, the wheel is rotated until the center pointer of the pointer mechanism points to the value determined in the previous step, the adjusting wheel of the pointer mechanism is rotated, until the center pointer points to zero, the maximum left and right lateral runout of the wheel rim is indicated by the two maximum pointers of the pointer mechanism after a complete revolution of the wheel, the wheel is rotated, until the center pointer of the pointer mechanism reaches one of the two maximum pointers which indicates the maximum left (respectively right) lateral runout of the wheel rim, the lateral runout of the wheel rim is corrected in a conventional manner by turning to the spoke nipples, whereby the spoke indicated by the pointer mechanism is tensioned or loosened via the spoke nipple, and the spokes are tensioned or loosened, starting in the region of the maximum left and right lateral runout of the wheel rim, sequentially in an alternating order and in at least two steps, with a corresponding number of revolutions of the wheel, until the left and right lateral runout remains within a minimum range.

According to a preferred embodiment of the invention, the maximum inward and outward radial runout of the wheel rim is subsequently determined from a full revolution of the wheel as a measurement value representing a deviation from a circle, the zero of the pointer mechanism is set between these measurement values, the radial runout of the wheel rim is corrected in a conventional manner by turning the spoke nipples, whereby the spoke indicated by the pointer mechanism is tensioned or loosened via the spoke nipple, the spokes are tensioned or loosened, starting in the region of the maximum radial runout of the wheel rim, sequentially inwardly and outwardly in an alternating order and in at least two steps, with a corresponding number of revolutions of the wheel, until the inward and outward radial runout is within a minimum range, and during the correction of the radial runout, the lateral runout of the wheel rim is monitored and optionally corrected.

According to the invention, the center position of the wheel rim is determined by subtracting the first left (respectively right) maximum lateral runout from the second right (respectively left) maximum runout, the value determined in the previous step is divided by two, thereby obtaining the distance of the second right (respectively left) maximum lateral runout from the center of the wheel axis, including the mathematical sign. The wheel is then rotated until the center pointer indicates the second right (respectively left) maximum lateral runout. The adjusting wheel of the pointer mechanism is then turned until of the center pointer points to the value determined in the previous step. The other steps are performed as described above. With this method, the center position of the wheel rim can be determined in all situations, even if the dial gauge is initially set to an arbitrary value.

According to another alternative feature for eliminating the lateral runout, the wheel can be rotated until the center pointer reaches the maximum value from the left and right maximum lateral runout—corresponding to the absolute maximum lateral runout. The spoke nipple at this location is turned until the center pointer indicates approximately half the absolute maximum lateral runout. During the following wheel revolution, another absolute maximum lateral runout is determined which, however, has a smaller value than the previously corrected maximum lateral runout. This process is repeated until the lateral runout is decreased to a desired value.

The radial runout can be eliminated in an analogous manner by rotating the wheel until the center pointer reaches the absolute maximum radial runout. The spoke nipple at this location is turned until the center pointer indicates approximately half of the absolute maximum radial runout. The adjacent spoke nipple is turned until of the radial runout produced by the previous adjustment of the spoke nipple is minimized. The next absolute maximum radial runout is then determined by again rotating the wheel, which however has a smaller value that the previously determined radial runout. This process is repeated a number of times until the absolute maximum radial runout is decreased to a desired value.

The device according to the invention includes as measurement devices at least one, preferably two pointer mechanisms of identical construction which preferably are releasably secured on the centering stand, wherein one pointer mechanism measures the lateral runout and another pointer mechanism measures the radial runout of the wheel rim, with an axially displaceable feeler rod being supported in each of the two pointer mechanisms, wherein the feeler rod is operatively connected with a support frame that can pivot about a pivot axis so that the axial displacement motion of the feeler rod is transformed without play into a pivoting motion of a center pointer, wherein the center pointer is operatively connected to both a left maximum pointer and a right maximum pointer, with the maximum pointers being configured to separately indicate the maximum left and right lateral runout of the wheel rim (10) when the lateral runout of the wheel rim (10) is tested and the maximum inward and outward runout of the wheel rim (10) when the radial runout of the wheel rim (10) is tested, and wherein the center pointer is affixed on the support frame that can pivot about the pivot axis, and wherein two mutually parallel, spaced-apart guides are arranged in the support frame that guide a ball-shaped transmission element on both sides. This arrangement allows the wheel to be centered quickly, accurately and in a simple matter. The method for intentionally and accurately centering the wheel is based on an exact determination of the center position and desired plane of the wheel. During the centering operation, the wheel rim can be exactly matched to the desired plane in individual steps. The pointer mechanism according to the invention provides an amplified display of the lateral and radial runout values of the wheel. The pointer mechanism of the invention indicates the runout of the wheel in a large and easily visualizable display area within a pointer range of less than 180°. The maximum pointers can display and measure the maximum deflection of the center pointer both to the left and to the right. Advantageously, when centering the wheel, one can start from the regions of maximum runout of the wheel rim and align these regions intentionally with the desired plane.

According to a preferred embodiment of the invention, a clamping fixture for receiving a wheel hub can be configured so as to be self-adjusting, so that the wheel to be adjusted can advantageously assume an exactly reproducible position. This is necessary so that the wheel always has a uniquely determined, defined center position during the centering process—even after the wheel is rotated according to the invention. This is easily achieved by the self-adjusting design. In particular, the wheel can be exactly positioned with a clamping fixture that has two mutually parallel, spaced-apart retaining elements which each include a receiving groove, which preferably form a 2-point-support for the hub. The 2-point-support guarantees a reproducibly defined position of the hub and hence also of the wheel.

According to another advantageous embodiment of the invention, each of the retaining elements can include a locking element which preferably can be latched. In this way, a hub of a wheel inserted into the receiving groove of the retaining elements can be held by the locking element in its initial position, whereby the initially assumed position is also maintained during the use of the centering device. The locking element preferably forms a 1-point-support for a hub, so that the entire hub is supported by a 3-point-support. The hub and hence also the wheel can then be precisely positioned.

Additional advantageous embodiments of the invention are described in the additional features recited in the dependent claims.

Exemplary embodiments of the invention will be described in detail hereinafter with reference to the appended drawings. It is shown in.

Figure 1:
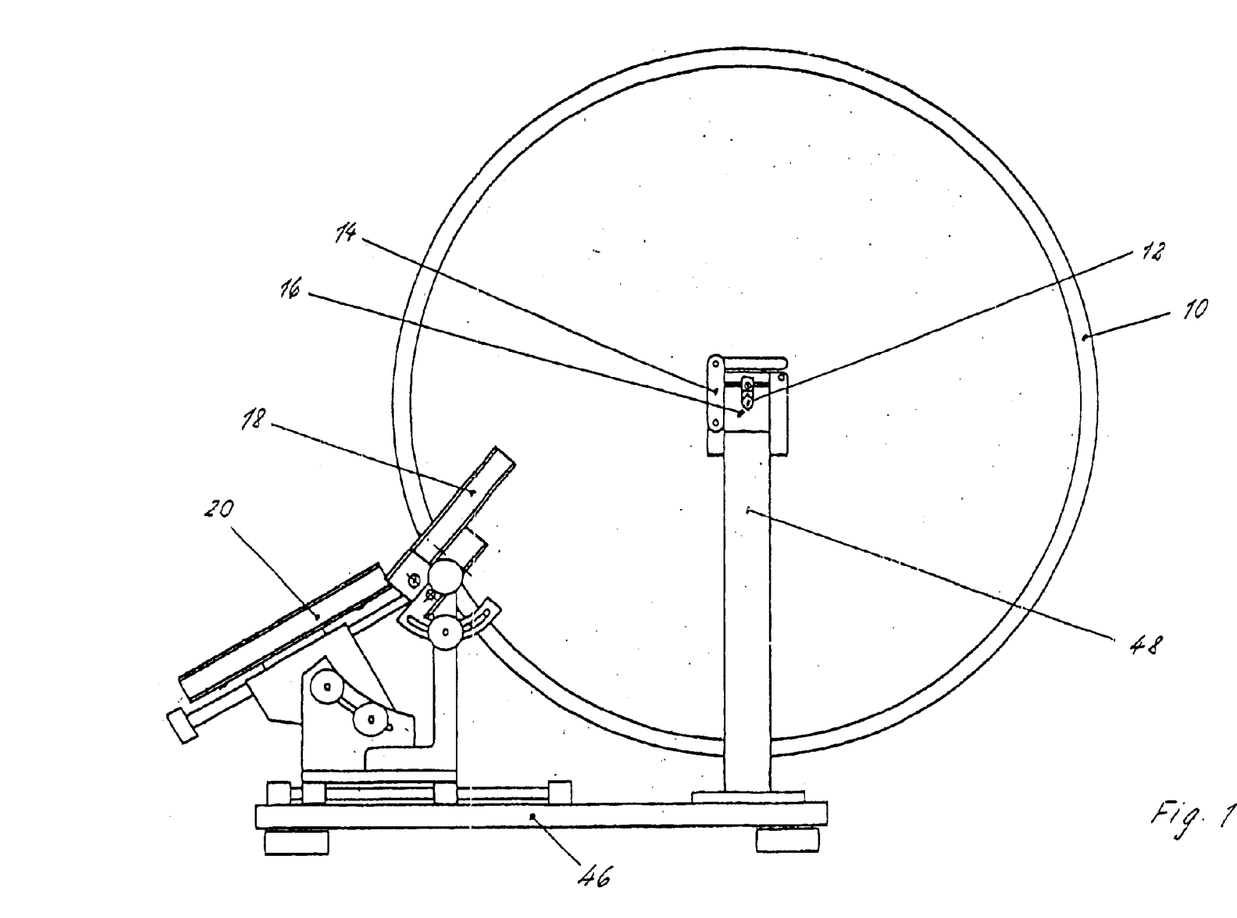
FIG. 1 a schematic side view of a centering stand with one pointer mechanism for measuring the lateral runout and another pointer mechanism for measuring the radial runout.

FIG. 1 shows a centering stand 46 with a frame 48 for receiving the wheel to be centered. The frame 48 supports a wheel fixture 16, in which the hub of the wheel is clamped. The position of the axle 12 of the wheel is precisely fixed by a clamping fixture 14. A pointer mechanism 18 for measuring the lateral runout and a pointer mechanism 20 for measuring the radial runout of the wheel rim 10 are attached to the centering stand 46. Alternatively, according to the invention, only one pointer mechanism 18 or 20 can be provided so that the device can be used, for example, for compensating either the lateral runout or the radial runout. Both pointer mechanisms 18, 20 can be constructed identically, but can be positioned in different positions relative to the wheel rim 10 depending on their intended use. The pointer mechanisms 18, 20 are secured to the frame of the centering stand 46 so that the positions of the pointer mechanisms 18, 20 relative to the wheel rim 10 can be changed and therefore the lateral runout and the radial runout of wheels with different rim diameters and rim widths can be controlled.

Figure 2:
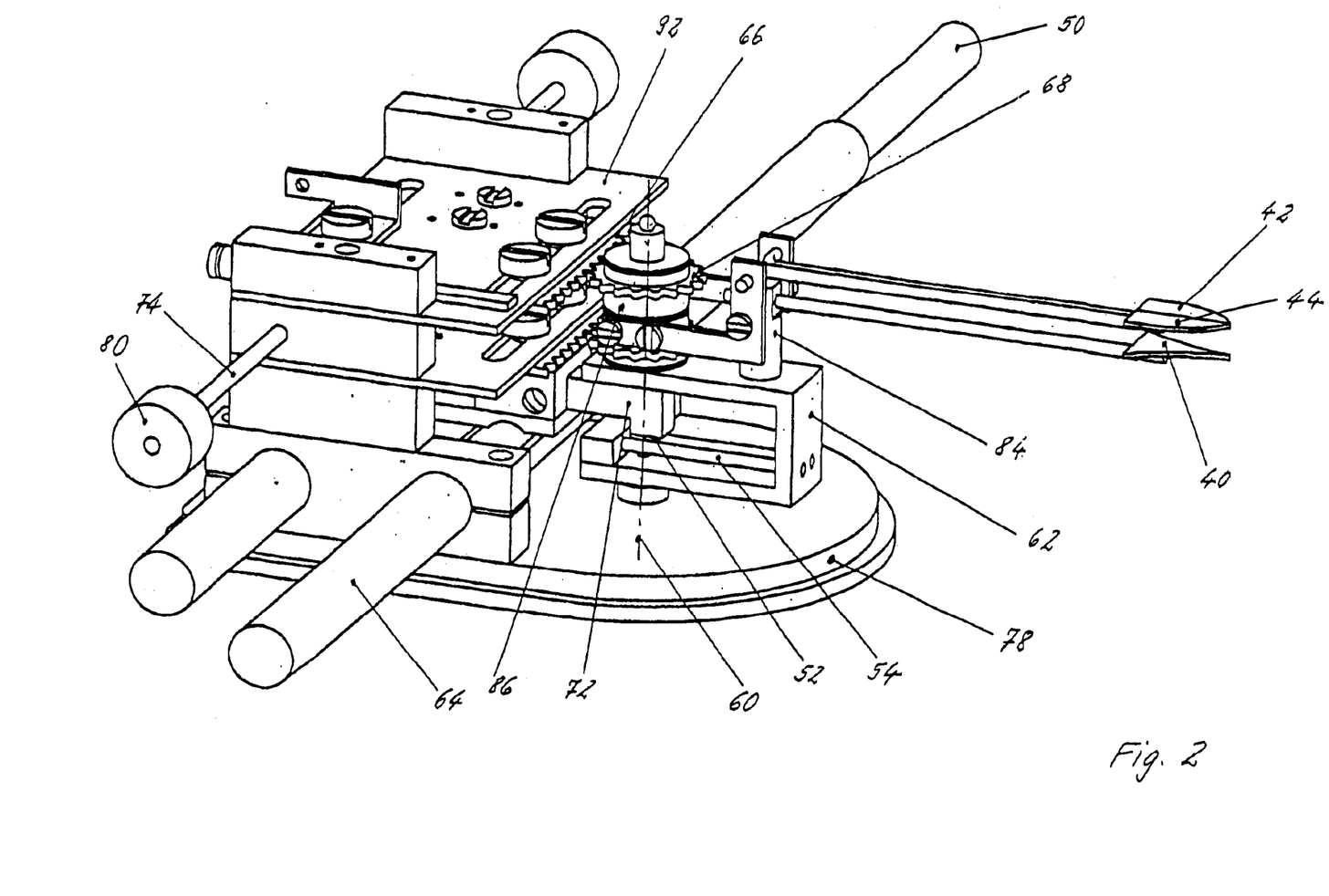
FIG. 2 a schematic perspective view of a pointer mechanism in a partially disassembled state.

FIG. 2 shows a partially disassembled pointer mechanism 18, 20. An axially displaceable feeler rod 50 is supported in a guide sleeve 64 in a housing 78 of the pointer mechanism 18, 20. For measuring the lateral and radial runout of the wheel rim, the feeler rods 50 of the pointer mechanisms 18, 20 are placed in direct contact with the wheel rim 10 in the corresponding axial and radial direction, respectively. When the wheel is rotated, the feeler rods 50 move depending on the respective axial and radial runout of the wheel rim 10. The feeler rod 50 is operatively connected via a seating element 72 with a support frame 62 that can pivot about a pivot axis 60. On one hand, the seating element 72 is operatively connected with the feeler rod 50 and can be axially displaced together with the feeler rod 50. On the other hand, the seating element 72 receives a ball-shaped transmission element 52 which is supported on both sides without play in a guide of a support frame 62. According to a preferred embodiment of the invention, two parallel spaced-apart cylindrical pins 54 form a guide on both sides of the ball-shaped transmission element 52. The center pointer 40 is mounted on the support frame 62 on a stud bolt 84, wherein the pointer 40 together with the support frame 62 pivot to the left or to the right about the pivot axis 60. The center pointer 40 is operatively connected to a left maximum pointer 42 as well as a right maximum pointer 44. The maximum pointers 42, 44 are each attached to a bearing bushing 86 which is supported for rotation about the pivot axis 60. The maximum pointers 42, 42 contact the stud bolt 84 directly on both sides. The center pointer 40 is attached to the stud bolt 84. The two maximum pointers 42, 44 together with the center pointer 40 each pivot to the left and right and thereafter remain in the position of the left and right maximum runout of the center pointer 40. In this way, the maximum left and right lateral runout can advantageously be determined when the wheel rim 10 is tested for lateral runout, and the maximum inward and outward radial runout of the wheel rim 10 can be determined separately when the wheel rim 10 is tested for radial runout. After the maximum runout of the wheel rim has been measured in the two directions, and after the maximum inward and outward radial runout of the wheel rim 10 has been measured, the maximum pointers 42, 44 can be easily returned to their initial positions. According to a preferred embodiment of the invention, the maximum pointers 42, 44 are operatively connected via a toothed gear with a displacement unit 92 to which a connecting rod 74 is attached. According to another preferred embodiment of the invention, the toothed gear consists of a toothed rack 66 and a gear wheel 68. An operating button 80 is attached to the connecting rod 74 to facilitate handling. The maximum pointers 42, 44 can be turned to their starting position by manually operating the connecting rod 74.

Figure 3:
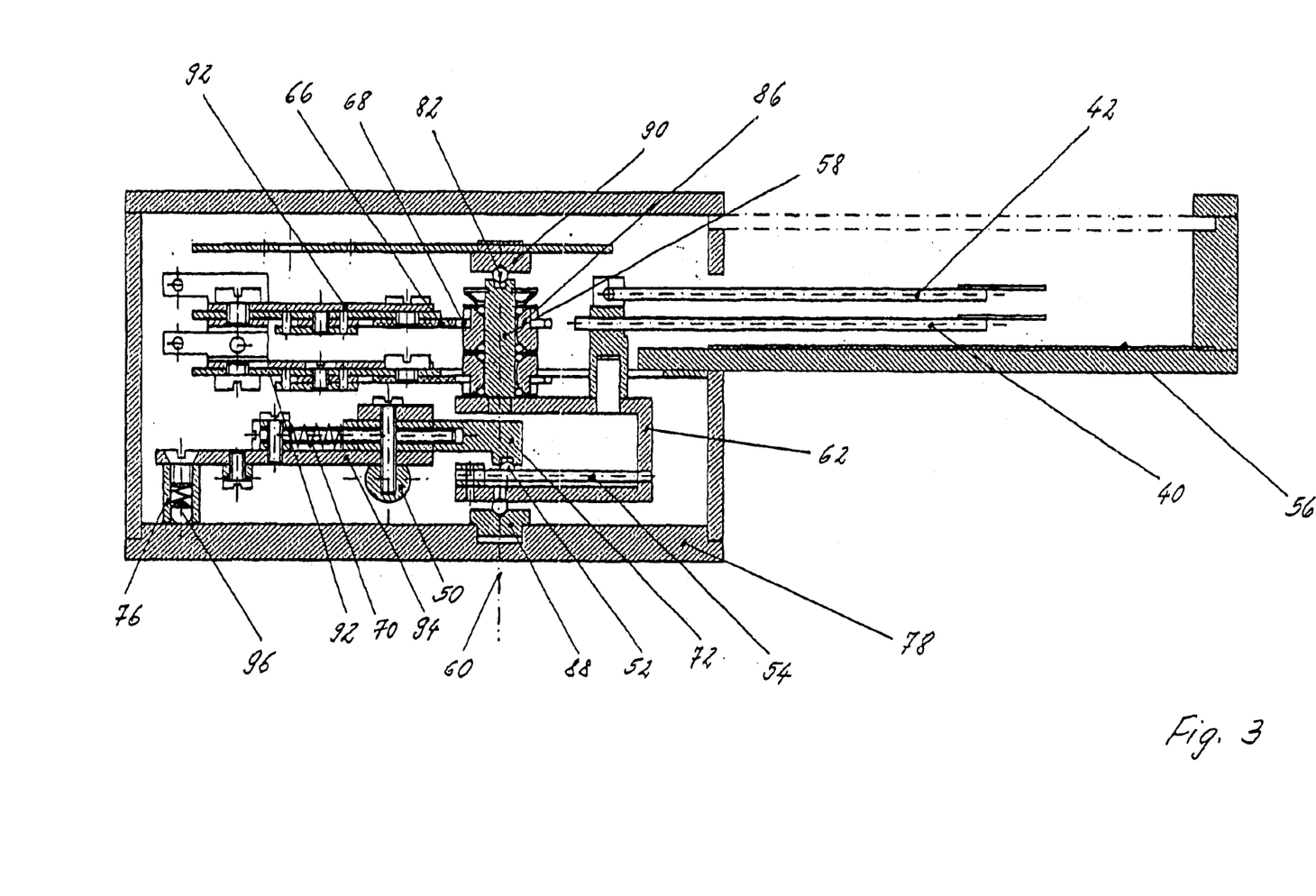
FIG. 3 a schematic cross-sectional view of a pointer mechanism.

FIG. 3 shows the pointer mechanism 18, 20 with the mechanism for transforming an axial displacement motion of the feeler rod 50 into a pivoting motion of the center pointer 40. The pointer mechanism 18, 20 is surrounded by a housing 78, with the dial face 56 being covered by a transparent disk. A lower bearing element 88 and an upper bearing element 90, each of which accept a ball 82, are arranged inside the housing 74. The balls 82 are located on the pivot axis 60 about which the support frame 62 with the pointers 40, 42 and 44 is pivotally supported. At the center of the pivoting axis 60, the support frame 62 supports a support bolt 58, with two bearing bushings 86 being coaxially supported for rotation about the support bolt 58. The left maximum pointer 42 and the right maximum pointer 44 are attached to the bearing bushings 86. Both bearing bushings 86 are operatively connected with the displacement unit 92 via a gear drive consisting of a gear wheel 68 and a toothed rod 66. A connecting rod 74 (not shown) is attached to the displacement unit 92, wherein the connecting rod 74 can be used to manually move the left maximum pointer 42 and the right maximum pointer 44 to their respective starting positions.

The support frame 54 receives two mutually parallel guides. According to a preferred embodiment of the invention, the guides are formed by two spaced-apart cylindrical pins 54. A transmission element 52, which is guided by the pins 54 without play, is disposed between the cylindrical pins 54. According to a preferred embodiment of the invention, the transmission element 52 has a spherical shape. The transmission element 52 is held by a seating element 72 which is operatively connected with the feeler rod 50 and thus directly transmits the motion of the feeler rod 50 to the support frame 62. The transmission element 52 has a variable distance 28 (FIGS. 5 and 6) to the pivot axis 60. The distance 28 has a minimum value at the starting position (zero position) of the center pointer 40. The distance 28 between the transmission element 52 and the pivot axis 60 increases with increasing pivot angle of the support frame 62. The seating element 72 is displaced by the force of a compression spring 70, with the connected transmission element 52 moving longitudinally between the cylindrical pins 54. The compression spring 70 is supported in a support plate 94, which is operatively connected with the feeler rod 50 and the support frame 62. One end of the support plate 94 contacts the housing 72 through a supporting ball 96 which is spring-biased and arranged inside a bushing 76.

Figure 4:
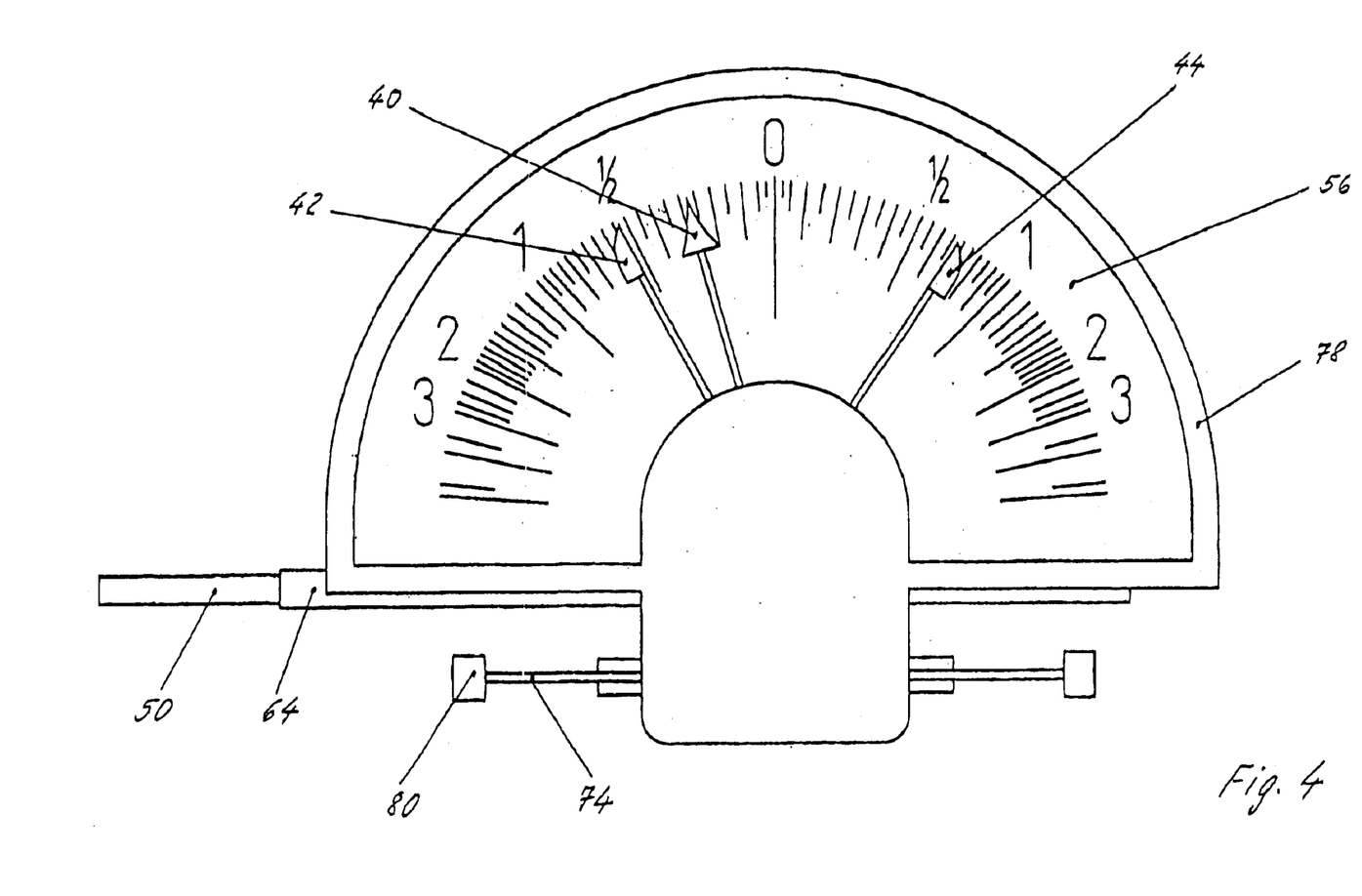
FIG. 4 a schematic front view of a pointer mechanism.

The pointer mechanism 18, 20 according to the invention is depicted schematically in FIG. 4. The graduation on the dial face 56 of the pointer mechanism 18, 20 can clearly display the corresponding lateral runout and radial runout of a wheel rim 10. Advantageously, the maximum rotation angle of the center pointer 40 is less than 180°. According to a particular advantageous feature of the invention, the maximum pointers 42 and 44 shows the maximum values of the left and right lateral runout of the wheel rim and of the inward and outward radial runout. Advantageously, the direction of the pivoting motion of the pointers 40, 42 and 44 corresponds to the direction of the axial displacement of the feeler rod 50, which makes conversions by a person reading the dial unnecessary.

Figure 5:
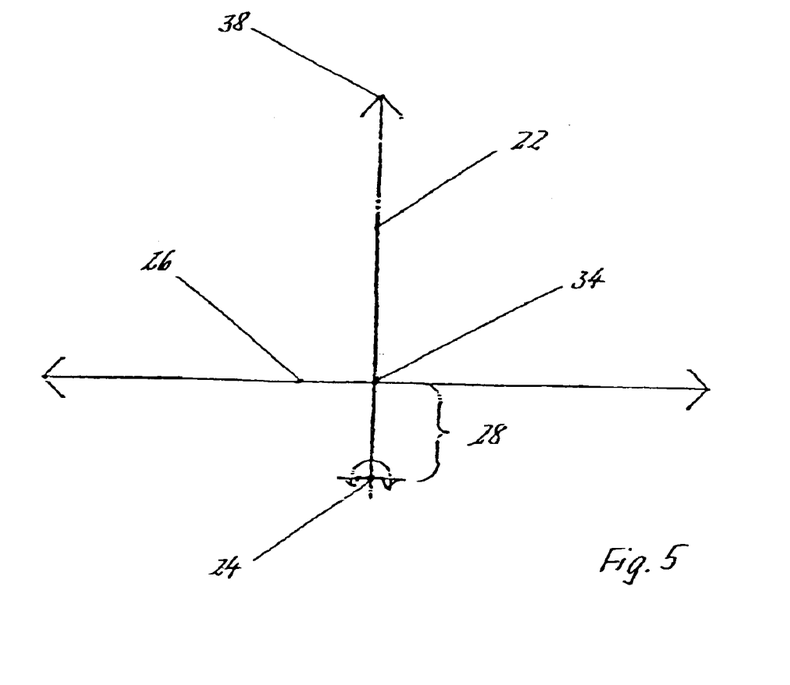
FIG. 5 a schematic diagram showing the transformation of an axial displacement motion of the feeler rod into a pivoting motion of the pointer, wherein the pointer is in the perpendicular initial position.
Figure 6:
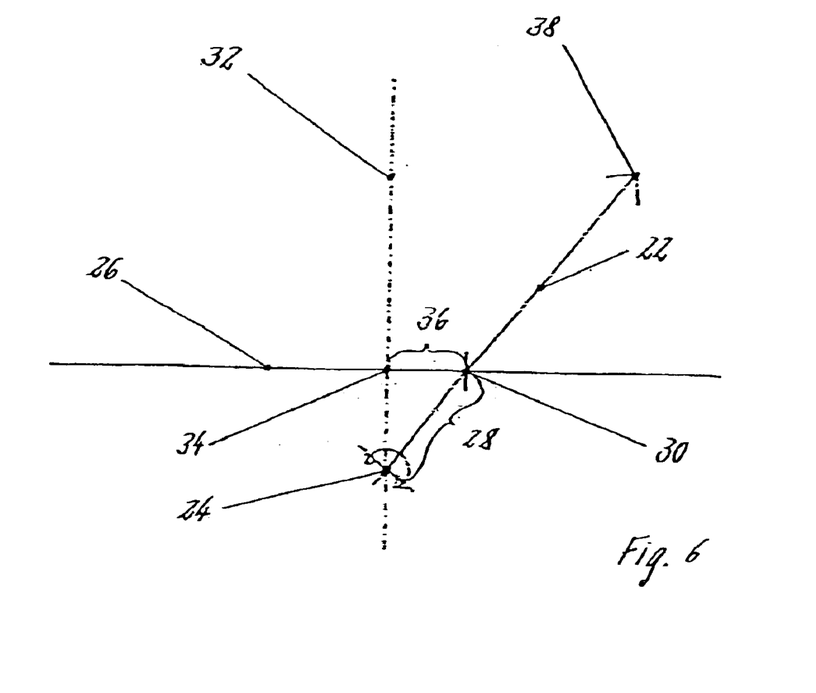
FIG. 6 a schematic diagram showing the transformation of an axial displacement motion of the feeler rod into a pivoting motion of the pointer, wherein the pointer is in a position rotated by an angle.

FIGS. 5 and 6 indicate the underlying operating principle of the pointer mechanism 18, 20 according to the invention. The figures show a lever 22 which can rotate above the pivot point 24 as a result of a force applied on the path 26. FIG. 5 shows the lever 22 in its initial position (zero position). FIG. 6 shows the lever 22 after rotation about the pivot point 24 by a certain angle. The vertical line 72 which intersects with the path 26 at the point of intersection 34 represents the initial position (zero position) of the lever 22. Both figures clearly show that upon rotation of the lever 22, the distance 28 between the pivot point 24 and the force transmitting point 30 increases with increasing pivot angle of the lever 22. As a result, when the distance 36, which represents the spacing between the force transmitting point 30 and the point of intersection 34, increases, the lever pivots by a smaller angle. The distance 28 increases with increasing pivot angle of the lever 22. With respect to the pointer mechanism 18, 20 of the invention, the lever 22 represents the support frame 62 with the attached center pointer 40. The pivot axis 60 about which the support frame 62 with the pointer 40 can rotate, represents the pivot point 24 of the pointer mechanism 18, 20. The feeler rod 50 moves in an axial direction of the path 26 and is connected at the force transmitting point 30 with the support frame 62. The connection is established by the transmission element 52 which can move in a guide 54 of the support frame 62. The tip 38 of the lever in the pointer mechanism 18, 20 is equivalent to the tip of the pointer 40. According to the solution described above, a rotation angle of the center pointer 40 is associated with each distance 36, with the association being established with a reference measuring device and mathematical equations. In this way, the graduation can be applied very precisely to the dial 56 of the pointer mechanism 18, 20.

Figure 7:
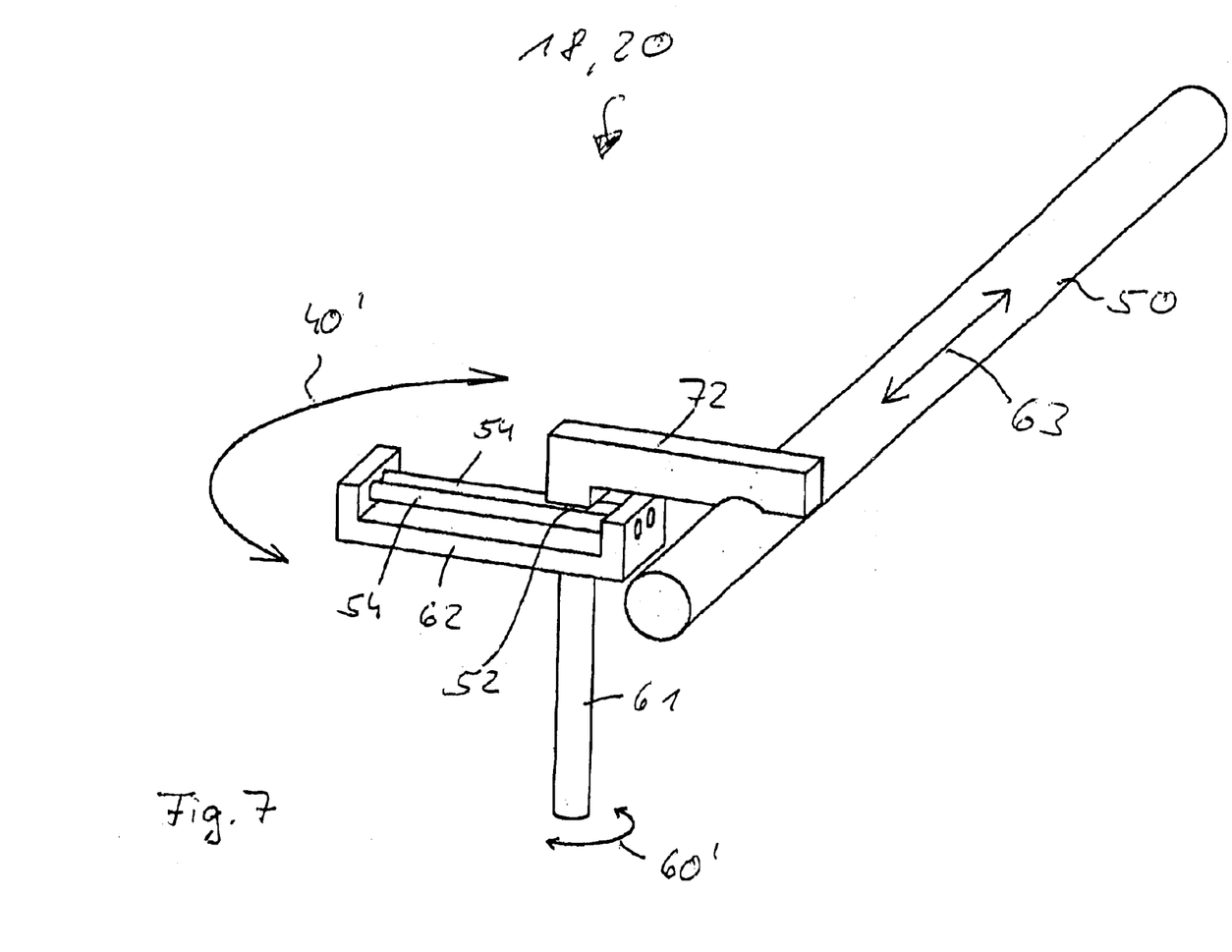
FIG. 7 an embodiment of a guide for a feeler rod.

FIG. 7 shows a particular simple design of a pointer mechanism, in particular in the region of the guide of a feeler rod 50. The feeler rod 50 is non-positively connected with a seating element 72 which connects the sensing rod 50 with the rotatable support frame 62. The support frame 62 has the mutual parallel spaced-apart cylindrical pins 54 which form a guide for the ball-shaped transmission element 52. The support frame 62 is rigidly connected with a bolt 61 which can perform the pivoting motion 60' (about the pivot axis 60 in FIG. 2).

The adjustability of the feeler rod 50 indicated in FIG. 7 by the double arrow 63, either for adjusting the lateral runout or the radial runout, urges the seating element 72 in the same direction. Since the support frame 62 can rotate by way of the bolt 61, but is otherwise stationary, this motion (double arrow 63) is transformed into the pivoting motion 60' of the support frame 62 and hence into the indicated pointer deflection 40'.

Advantageously, the invention covers at wide measurement range and accurately displays values about the zero position, as is required for centering wheels. The entire pivoting motion of the center pointer 40 takes place on a well arranged semicircle. The maximum deflection of the center pointer 40 to the left and to the right is indicated advantageously by the left maximum pointer 42 and the right maximum pointer 44, respectively.

The method for centering a wheel according to the invention is performed in the following steps. First, the hub of the wheel is clamped in a wheel support 16 of a centering stand 46. The wheel is then rotated, whereby both the maximum left and right lateral excursion of the wheel rim 10 are determined as measurement values from a complete revolution of the wheel. The measurement value of the left (respectively right) maximum lateral runout of the wheel rim 10 is recorded with its mathematical sign. A negative sign is associated with the measurement value to the left of the zero position, and a positive sign is associated with the measurement value to the right of the zero position. The wheel is then rotated by 180° and clamped in the wheel support 16 of the centering stand 46. The respective maximum left and right lateral runout of the wheel rim 10 is then once more determined as a measurement value from a complete revolution of the wheel. The left (respectively right) maximum lateral runout and the second right (respectively left) maximum runout of the wheel rim 10 are then subtracted from each other. The value determined in the previous step is then divided by two and a positive sign is associated with this value. The value determined in the previous step is then subtracted from the second right (respectively left) maximum lateral runout of the wheel rim 10. The wheel is then rotated, until the center pointer 40 of the pointer mechanism 18 points to the value determined in the previous step. The adjusting wheel of the pointer mechanism 18 is turned until the center pointer 40 points to zero. The pointer mechanism 18, by positioning the center pointer 40 at zero, indicates the center of the axle 12 of the wheel. The lateral runout of the wheel rim 10 can then be eliminated.

After a complete revolution of the wheel, the maximum left and right lateral runout of the wheel rim 10 are indicated by the two maximum pointers 42, 44 of the pointer mechanism 18. The wheel is rotated, until the center pointer 40 of the pointer mechanism 18 has agrees with one of the two maximum pointers 42, 44, which indicates the maximum left (respectively right) lateral runout of the wheel rim 10. In a manner known in the art, the lateral runout of the wheel rim is corrected by turning the spoke nipples, i.e., by loosening or tightening the spoke nipple of the spoke indicated by the pointer mechanism 18. The spokes are tightened or loosened, starting from the region of the maximum left or right lateral excursion of the wheel rim 10, consecutively in alternating order and in at least two steps, with a corresponding number of revolutions of the wheel, until the left lateral runout and right lateral runout reach a minimum value.

Thereafter, the maximum inward and outward radial runout of the wheel rim 10 is determined as a measurement value from a complete revolution of the wheel as a deviation from a circle, and the zero position of the pointer mechanism 20 is set between these measurement values. The radial runout of the wheel rim 10 is then corrected in a manner known in the art by turning the spoke nipples, i.e., by tightening or loosening the spoke nipple of the spoke indicated by the pointer mechanism 20. The spokes are tightened or loosened inwardly and outwardly, starting from the region of the maximum radial runout of the wheel rim 10, consecutively in alternating order and in at least two steps, with a corresponding number of revolutions of the wheel, until the inward and outward radial runout of the wheel rim 10 reaches a minimum value. While the radial runout of the wheel rim 10 is corrected, the lateral runout of the wheel rim 10 is monitored and, if necessary, also corrected.

Figure 8:
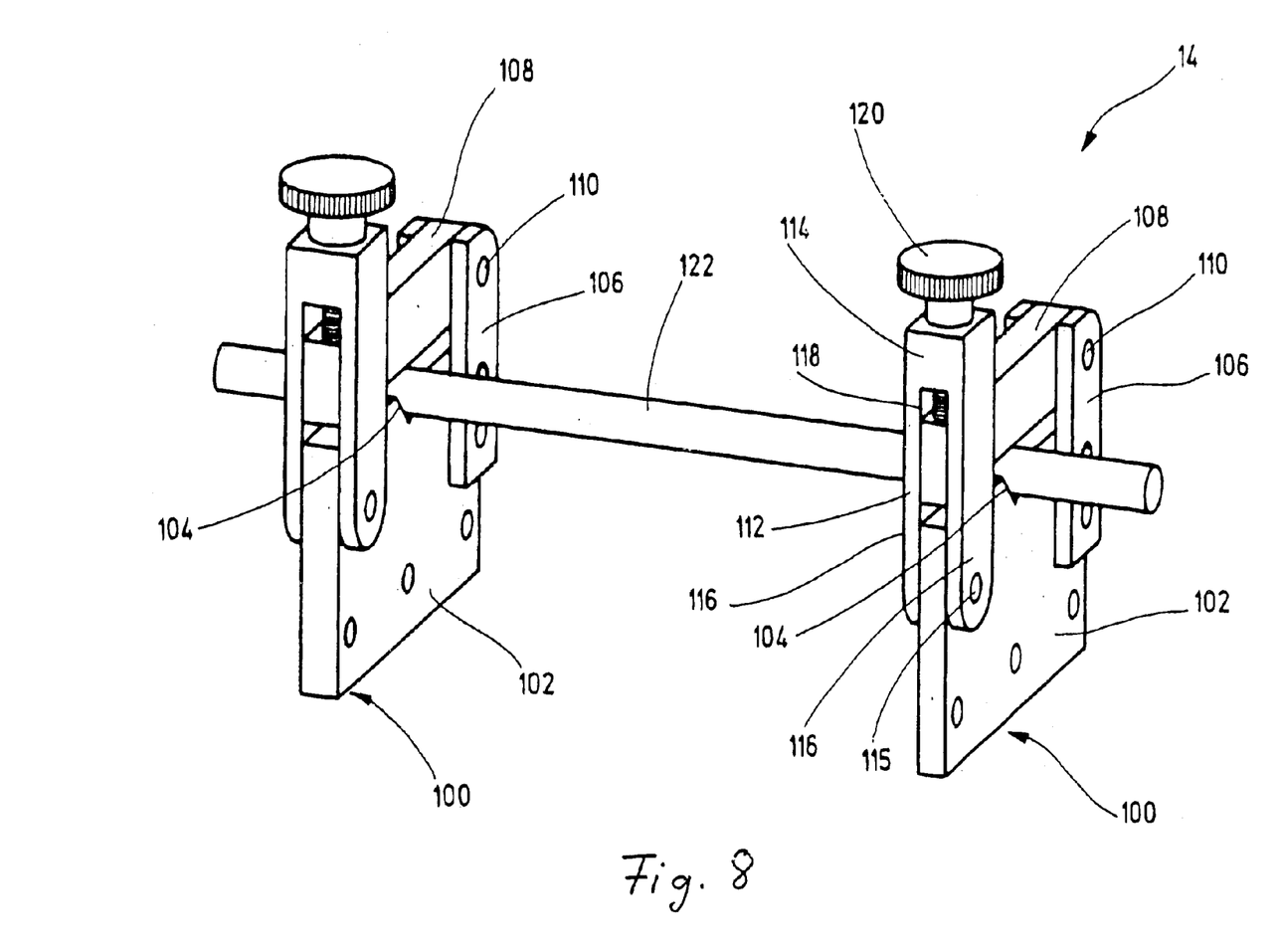
FIG. 8 a perspective view of a clamping fixture.

FIG. 8 shows schematically a perspective view of a clamping mechanism 14. The clamping mechanism 14 includes two mutually parallel retaining elements 100. The retaining elements 100 include each a baseplate 102 that is connected with a centering stand 46. Each of the baseplate 102 forms a receiving groove 104. The baseplate 102 also includes a retaining element 106 for a locking element 108. The retaining element 106 is fixedly connected with the baseplate 102, whereas the locking element 108 is rotatable about a pivot axis 110 relative to the retaining element 106.

In addition, a locking element 112 is pivotally supported on the baseplate 102 via a rotation axis 115. The locking element 112 forms a locking section 114, from which support arms 116 extend. The support arms 116 are arranged mutually parallel and form a slot-like recess 118 that is open on one marginal edge. A depth of the recess 118 is selected so as to be capable of receiving the locking element 108, as indicated in FIG. 1. A fixing element 120, for example a set screw or the like, is guided through the locking section 114. The fixing element 120 has an outside thread which matches an inside thread of the locking section 114.

Figure 9:
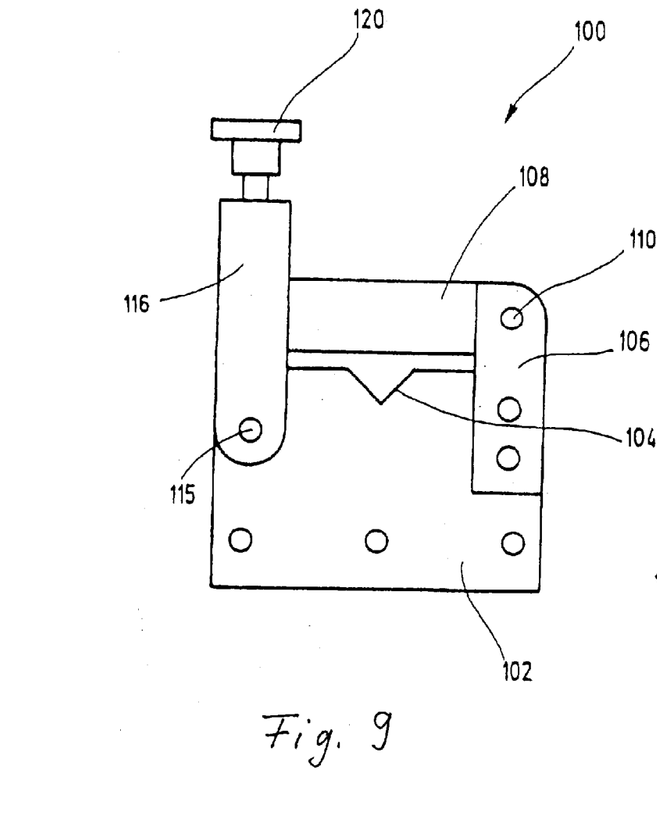
FIGS. 9 and 10 the clamping fixture in a receiving position and in a locking position, respectively.
Figure 10:
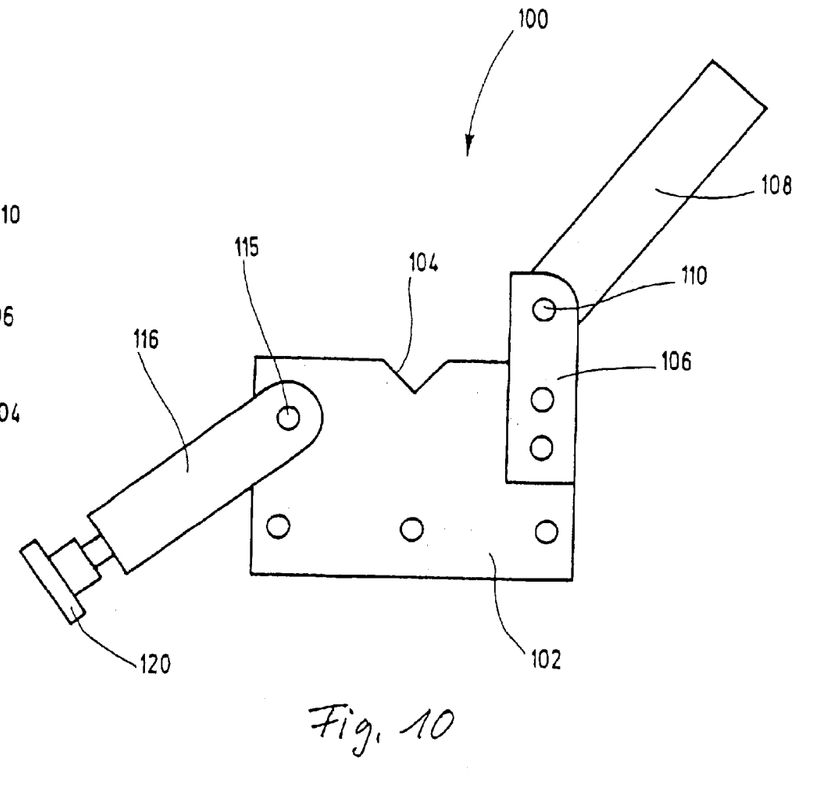

FIGS. 9 and 10 show a retaining element 100 in its centered position (FIG. 9) and in a receiving position (FIG. 10). Like elements are indicated with the same reference numerals as in FIG. 1 and will not be described again.

The clamping fixture 14 has the following function:

In the receiving position indicated in FIG. 10, the hub 122 (FIG. 8) of a wheel is inserted into the receiving grooves 104. The receiving grooves 104 are formed by a V-shaped recess, so that the hub 122 makes contact in the receiving groove 104 at two points. After the hub 122 is inserted, the locking element 108 it is rotated about the pivot axis 110 until it contacts the hub 122. This arrangement provides an additional 1-point support for the hub 122, so that the hub 122 is held altogether in a 3-point support. The locking element 108 is hereby oriented essentially parallel to a top side of the baseplate 102 of the retaining element 100. The locking element 112 is subsequently rotated about its rotation axis 115, so that an end of the locking element 108 that faces away from the rotation axis 115 engages with the recess 118. The hub 122 can be clamped in the retaining element 100 by operating the fixing element 120. The hub 122 then has a fixed, well defined, and always reproducible position.

List of Reference Numerals 10 wheel rim
12 axle
14 clamping fixture
16 wheel support
18 pointer mechanism (for lateral runout)
20 pointer mechanism (for radial runout)
22 lever
24 pivot point
26 path 28 distance
30 force transmission point
32 vertical line
34 point of intersection
36 distance
38 lever tip
40 center pointer
42 left maximum pointer
44 right maximum pointer
46 centering stand
48 frame
50 feeler rod
52 transmission element
54 cylindrical pin
56 dial face
58 support bolt
60 pivot axis
62 support frame
64 guide sleeve
66 toothed rack
68 gear wheel
70 compression spring
72 seating element
74 connecting rod
76 bushing
78 housing
80 operating button
82 ball
84 stud bolt
86 bearing bushing
88 lower bearing element
90 upper bearing element
92 displacement unit
94 support plate
96 supporting ball
100 retaining element
102 base plate
104 receiving groove
106 retaining element
108 locking element
110 pivot axis
112 locking element
114 locking section
115 rotation axis
116 support arm
118 recess
120 fixing element
122 hub

What is claimed is:

1. Method for centering a wheel, especially a wheel of a bicycle, wherein the values of the lateral runout and/or the radial runout of the wheel rim are measured and the lateral runout and/or the radial runout are subsequently eliminated by rotating the spoke nipples, characterized in that
   a) the wheel hub is clamped in a wheel mount of a centering stand,
   b) the wheel is rotated, whereby, each of the maximum left and right lateral runout of the wheel rim (10) is determined as a measurement value from a complete revolution of the wheel,
   c) the measurement value of the left (respectively right) maximum lateral runout of the wheel rim (10) is recorded, including its mathematical sign, whereby a negative sign is associated with the measurement value left of the zero position and a positive sign is associated with the measurement value right of the zero position,
   d) the wheel is rotated by 180° and clamped,
   e) from a complete rotation of the wheel, each of the maximum left and right lateral runout of the wheel rim (10) is determined as a measurement value,
   f) the first left (respectively the first right) maximum lateral runout and the second right (respectively the second left) maximum lateral runout of the wheel rim (10) are subtracted from each other,
   g) the value determined in step f) is divided by 2, with a positive sign associated with the so obtained value,
   h) the value determined in step g) is subtracted from the right (respectively left) maximum lateral runout of the wheel rim (10),
   i) the wheel is rotated until a center pointer (40) of a pointer mechanism (18) points to the value determined in step h),
   j) the adjusting wheel of the pointer mechanism (18) is rotated, until the center pointer (40) points to zero,
   k) after a complete revolution of the wheel, the maximum left and right lateral runout of the wheel rim (10) is indicated by two maximum pointers (42, 44) of the pointer mechanism (18),
   l) the wheel is rotated, until the center pointer (40) of the pointer mechanism (18) agrees with one of the two maximum pointers (42, 44) which indicates the maximum left (respectively right) lateral runout of the wheel rim (10),
   m) the lateral runout of the wheel rim (10) is corrected in a conventional manner by turning to the spoke nipples, whereby the spoke indicated by the pointer mechanism (18) is tensioned or loosened via the spoke nipple, and
   n) the spokes are tensioned or loosened, starting in the region of the maximum left and right lateral runout of the wheel rim (10), sequentially in an alternating order and in at least two steps, with a corresponding number of revolutions of the wheel, until the left and right lateral runout remains within a minimum range.

2. Method according to claim 1, characterized in that
   a) the maximum inward and outward radial runout of the wheel rim (10) is subsequently determined from a full revolution of the wheel as a measurement value representing a deviation from a circle,
   b) the zero (0) of the pointer mechanism (18) is set between these measurement values,
   c) the radial runout of the wheel rim (10) is corrected in a conventional manner by turning the spoke nipples, whereby the spoke indicated by the pointer mechanism (20) is tensioned or loosened via the spoke nipple,
   d) the spokes are tensioned or loosened, starting in the region of the maximum radial runout of the wheel rim (10), sequentially inwardly and outwardly in an alternating order and in at least two steps, with a corresponding number of revolutions of the wheel, until the inward and outward radial runout is within a minimum range, and
   e) during the correction of the radial runout, the lateral runout of the wheel rim (10) is monitored and optionally corrected.

3. Device for carrying out the method according to claim 1, comprising a centering stand with a frame for receiving a hub of a wheel to be centered and a stand for receiving measurement devices for measuring the values of the lateral runout and/or the radial runout of the wheel rim of the wheel, wherein the measurement devices can be attached to the frame of the centering stand in different positions relative to the wheel, characterized in that as measurement devices at least one, preferably two pointer mechanisms (18, 20) of identical construction are releasably secured on the centering stand (46), wherein one pointer mechanism (18) measures the lateral runout and another pointer mechanism (20) measures the radial runout of the wheel rim (10), and an axially displaceable feeler rod (50) is supported in each of the two pointer mechanisms (18, 20), wherein the feeler rod (50) is operatively connected with a support frame (62) that can pivot about a pivot axis (60) so that the axial displacement motion of the feeler rod (50) is transformed into a pivoting motion of a center pointer (40), wherein the center pointer (40) is operatively connected to both a left maximum pointer (42) and a right maximum pointer (44), with the maximum pointers being configured to separately indicate the maximum left and right lateral round of the wheel rim (10) when the lateral runout of the wheel rim (10) is tested and the maximum inward and outward runout of the wheel rim (10) when the radial runout of the wheel rim (10) is tested, and that the center pointer (40) is affixed on the support frame (62) that can pivot about the pivot axis (60), wherein two mutually parallel, spaced-apart guides are arranged in the support frame (62) that guide a ball-shaped transmission element (52) on both sides without play.

4. Device according to claim 3, characterized in that two cylindrical pins (54) having the form of two mutually parallel, spaced apart guides are arranged inside the rotatable support frame (62).

5. Device according to claim 1, characterized in that the transmission element (52) is in the form of a ball.

6. Device according to claim 1, characterized in that the maximum pointers (42, 44) are each operatively connected to a displacement unit (92) via a gear drive, with a connecting rod (74) being connected to the displacement unit (92).

7. Device according to claim 6, characterized in that the gear drive comprises a toothed rack (66) and a gear wheel (68).

8. Device according to claim 6, characterized in that an operating button (80) is attached to the end of the connecting rod (74) for manual operation of the connecting rod (74).

9. Device according to claim 1, characterized in that a clamping fixture (14) for receiving a hub of the wheel is configured so as to be self-adjusting.

10. Device according to claim 9, characterized in that the clamping fixture (14) comprises two mutually parallel, spaced-apart retaining elements (104), with each of the retaining elements including a receiving groove (104).

11. Device according to claim 1, characterized in that the receiving groove (104) forms a 2-point-support for a hub (122).

12. Device according to claim 1, characterized in that each of the retaining elements (100) comprises a locking element (108).

13. Device according to claim 1, characterized in that the locking element (108) forms a 1-point-support for a hub (122).

14. Device according to claim 1, characterized in that the locking element (108) can be latched.

15. Device according to claim 1, characterized in that the arresting element (108) can be locked.

* * * * *